Patented June 9, 1931

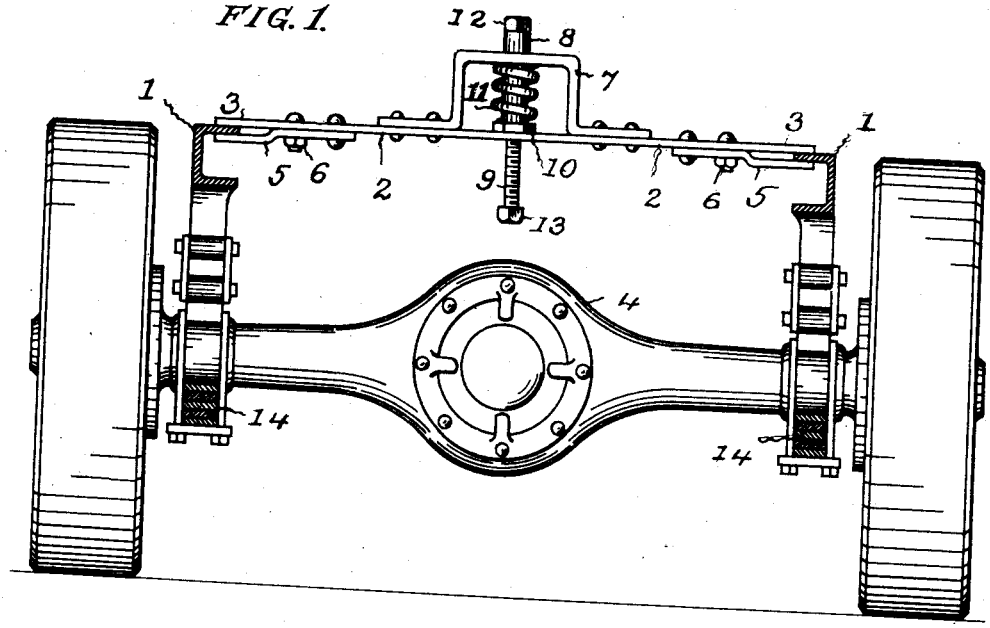
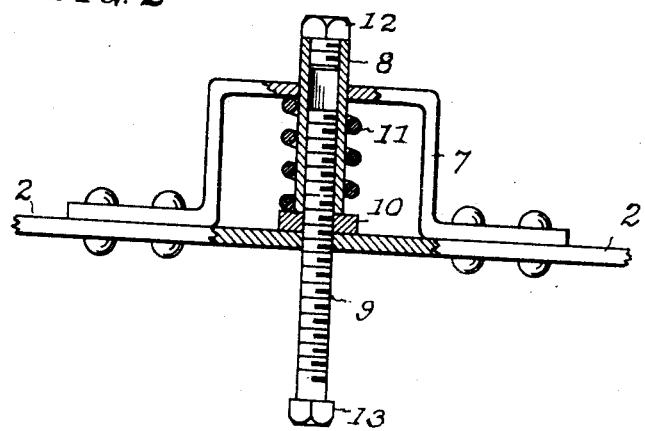

1,809,373

UNITED STATES PATENT OFFICE

PERRY B. BONNETTE, OF CHICAGO, ILLINOIS

OVERLOAD INDICATOR

Application filed August 14, 1930. Serial No. 475,309.

This invention relates to an overload indicating mechanism for motor trucks and the like, and has for its object:

To provide a structural formation and combination of parts adapted for ready attachment to the underframe of a motor truck in operative relation to the rear axle of the same, and adapted to afford a convenient indication that an overload is carried on the truck, all as will hereinafter more fully appear.

In the accompanying drawings:—

Fig. 1 is a rear elevation showing the invention applied to a motor driven truck, portions of the underframe of the truck and its springs being shown in section.

Fig. 2 is an enlarged detail section of the central portion of the appliance.

Like reference numerals indicate like parts in both views.

This appliance comprises a supporting rail 2 extending transversely between the longitudinal channel bars 1 of the under frame of a motor truck, the respective ends of said rail 2 being provided with attaching means 3 by which fixed attachment of the rail is made to the channel bars 1 at a point above the transmission housing 4 of the rear axle of the truck and in parallel relation to said housing and axle.

In the preferred construction shown in Fig. 1 the end attaching means of the rail 2 comprises clip plates 5 secured to the rail 1 by clamping bolts 6, and having offset outer portions to provide receiving spaces for the horizontal webs of the aforesaid longitudinal channel bars 1 of the truck underframe, upon which webs the rail is fixedly secured by a manipulation of the clamping bolts 6.

Centrally of the main rail 2 an arch frame 7, preferably of a rectangular shape as shown, is fixedly attached, and is provided with a central guide orifice for the indicator stem now to be described.

The indicator stem above referred to comprises an internally screw threaded tubular member 8 and a screw threaded bolt 9 having vertical adjustable engagement in the bore of said tubular member, with the parts secured at a required adjustment by a locking nut or collar 10 on the bolt 9 and adapted for the usual locking abutment against the lower end of the tubular member 8. Said locking nut or collar 10 provides a bearing for the lower end of a compression spring 11, the upper end of which has bearing engagement against the under face of the arch frame 7 and acting to impose a resilient downward stress upon the indicator stem, and in addition the nut or collar 10 is adapted for stop abutment against the upper surface of the main rail 1 in a normal condition of the indicator means.

The tubular indicator member 8 is guided vertically by a guide orifice formed therefor in the crown of the arch frame 7 aforesaid, and its upper end is preferably closed by a cap bolt 12 as shown. In like manner the bolt 9 is guided in its vertical movement by a guide orifice formed therefor in the main rail 2. At its lower end the bolt 8 is formed with a contact head 13, for operative contact with the upper surface of the transmission housing 4 of the rear axle of the truck.

In actual use, the screw threaded bolt 9 is adjusted vertically in the tubular member 8, with its contact head 13 a distance above the transmission housing 4, that with a normal load on the vehicle, and a corresponding compression of the truck springs 14, the contact head 13 of said bolt will be in operative contact with said transmission housing 4, so that with any subsequent overloading of the truck, the indicator stem, comprising the member 8 and adjustable bolt 9, will have a corresponding movement above the arch frame 7 to visibly indicate the extent of any overload on the truck.

Having thus fully described my invention, what I claim as new, is:—

1. An overload indicator for trucks comprising a transverse rail adapted for fixed attachment to the longitudinal beams of the truck underframe, an arch frame fixed centrally on said rail, an indicator stem guided vertically in said rail and frame, and a spring tending to force said indicator stem downwardly, the lower end of the indicator stem having a normal spaced relation to the top of the transmission housing of the rear axle of the truck.

2. An overload indicator for trucks comprising a transverse rail adapted for fixed attachment to the longitudinal beams of the truck underframe, an arch frame fixed centrally on said rail, an indicator stem guided vertically in said rail and frame and comprising an upper internally screw threaded tubular member and a lower screw threaded bolt engaging said tubular member, and a spring tending to force said tubular member and bolt downwardly.

Signed at Chicago, Illinois this 9th day of August, 1930.

PERRY B. BONNETTE.